United States Patent [19]

Elsbett et al.

[11] Patent Number: 4,854,291
[45] Date of Patent: Aug. 8, 1989

[54] CYLINDER HEAD FOR USE IN DIESEL ENGINES

[76] Inventors: Ludwig Elsbett; Günter Elsbett; Klaus Elsbett, all of Industriestrasse 14-16 D-8543 Hilpoltstein, Fed. Rep. of Germany

[21] Appl. No.: 118,187

[22] Filed: Nov. 6, 1987

[30] Foreign Application Priority Data

Nov. 7, 1986 [DE] Fed. Rep. of Germany ....... 3638029

[51] Int. Cl.⁴ ............................................. F02M 25/06
[52] U.S. Cl. ...................................... 123/569; 123/568
[58] Field of Search ............... 123/315, 568, 569, 570, 123/432, 193 H

[56] References Cited

U.S. PATENT DOCUMENTS

| | | | |
|---|---|---|---|
| 3,682,151 | 8/1972 | Tatsutomi | 123/570 |
| 4,422,430 | 12/1983 | Wiatrak | 123/568 |
| 4,643,157 | 2/1987 | Nishikawa et al. | 123/568 |

FOREIGN PATENT DOCUMENTS

| | | | |
|---|---|---|---|
| 0025962 | 2/1986 | Japan | 123/568 |
| 0028748 | 2/1986 | Japan | 123/568 |
| 0028749 | 2/1986 | Japan | 123/568 |

*Primary Examiner*—Willis R. Wolfe
*Attorney, Agent, or Firm*—Peter K. Kontler

[57] ABSTRACT

The cylinder head of a diesel engine has two passages one of which admits air into the combustion chamber and the other of which evacuates combustion products from the cylinder chamber. The two passages are connected to each other by a channel which admits combustion products into the one passage when the air-admitting valve opens whereby the stream of combustion products sets the inflowing air into rotary motion or accelerates the rotating mass of air. This entails a reduction of emission of noxious fumes and promotes the combustion of fuel which is injected into the body of circulating air in the combustion chamber.

14 Claims, 2 Drawing Sheets

CYLINDER HEAD FOR USE IN DIESEL ENGINES

BACKGROUND OF THE INVENTION

The invention relates to internal combustion engines, especially diesel engines, and more particularly to improvements in cylinders for use in such engines. Still more particularly, the invention relates to cylinders of the type wherein the head of the cylinder has a first passage for admission of air into the combustion chamber and a second passage for evacuation of combustion products from the combustion chamber.

German Pat. No. 22 41 355 discloses a diesel engine wherein the passage for the admission of air contains vortex forming elements which induce the admitted air to circulate in and about the axis of the combustion chamber. A spray of fuel is admitted tangentially into the combustion chamber so that it penetrates into the circulating mass of air in the direction of flow of air during a predetermined stage of movement of the piston so as to ensure the establishment of a pronounced separation zone between an inner vortex which contains hot gaseous combustion products and an outer stratum which contains air. The quality of separation of the inner vortex from the outer stratum depends on the intensity of the vortex.

Reference may also be had to U.S. Pat. No. 3,945,363, granted Mar. 23, 1976 to Ludwig and Günter Elsbett, which discloses a reciprocable piston internal combustion engine provided with a swirl forming passage.

OBJECTS AND SUMMARY OF THE INVENTION

An object of the invention is to provide a novel and improved cylinder for use in diesel engines and/or other types of internal combustion engines wherein the head is constructed and assembled in such a way that it promotes the establishment of a pronounced vortex of oxygen-containing gases and/or a mixture of such gases with uncombusted fuel.

Another object of the invention is to provide a novel and improved cylinder head.

A further object of the invention is to provide a novel and improved method of promoting the circulation of air immediately prior to admission into the combustion chamber in the cylinder and/or piston of an internal combustion engine.

An additional object of the invention is to provide a cylinder which is constructed and assembled in such a way that it can induce the air to form a pronounced vortex wherein the air circulates at a very high speed even prior to entering the combustion chamber.

Another object of the invention is to provide an engine which embodies the above outlined cylinder.

Still another object of the invention is to provide a cylinder head wherein the intensity of circulation of air prior to admission into the combustion chamber can be varied within a desired range.

A further object of the invention is to provide a cylinder wherein the air can be circulated at an elevated speed without necessitating the consumption of additional energy and without unduly contributing to complexity and/or bulk of the cylinder.

The invention is embodied in a cylinder which can be used in an internal combustion engine, such as a diesel engine, and comprises a head having an air-admitting first passage, a second passage for evacuation of combustion products, and channel means connecting the first and second passages so as to admit combustion products into the first passage. The effective diameter of the channel means is preferably 3–6 mm, most preferably about 4 mm.

The cylinder further defines a combustion chamber (either alone or in conjunction with the associated piston of the engine, and the cylinder further comprises valve means installed in the head and serving to control the admission of air from the first passage into the combustion chamber. The admission of combustion products from the second into the first passage can take place in such a way that the stream or jet of combustion products leaving the channel means flows substantially tangentially with reference to an imaginary circle whose center is located on the axis of the valve means and whose diameter preferably equals or approximates 70 percent of the diameter of the circular portion of the first passage adjacent the outlet which is defined by the seat for the valve means. The head can be provided with a substantially volute-shaped surface which bounds a portion of or the entire first passage to induce the inflowing air to form a vortex.

The channel means can constitute a bore in the cylinder head. Alternatively, the channel means can be defined by a tubular member which is installed in the bore. Such tubular member can have an inlet which communicates with the second passage and an outlet which is or can be inclined with reference to the inlet and communicates with the first passage.

The flow of combustion products from the combustion chamber into the second passage is controlled by second valve means which is or can be parallel to the valve means for controlling the flow of air from the first passage into the combustion chamber, and the channel means is preferably inclined with reference to the axes of both valve means and is preferably spaced apart from these axes and oriented in such a way that it discharges a stream of combustion products close to the outlet of the first passage.

In accordance with a presently preferred embodiment of the invention, the channel means is closely or immediately adjacent the valve means and is designed to effect the formation of a vortex (spin or turbulence) of air in the first passage. The aforementioned tubular means can be installed in the channel means in such a way that it determines the direction of flow of combustion products from the second passage into the first passage tangentially of the valve seat for the air discharge valve.

The novel features which are considered as characteristic of the invention are set forth in particular in the appended claims. The improved cylinder itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
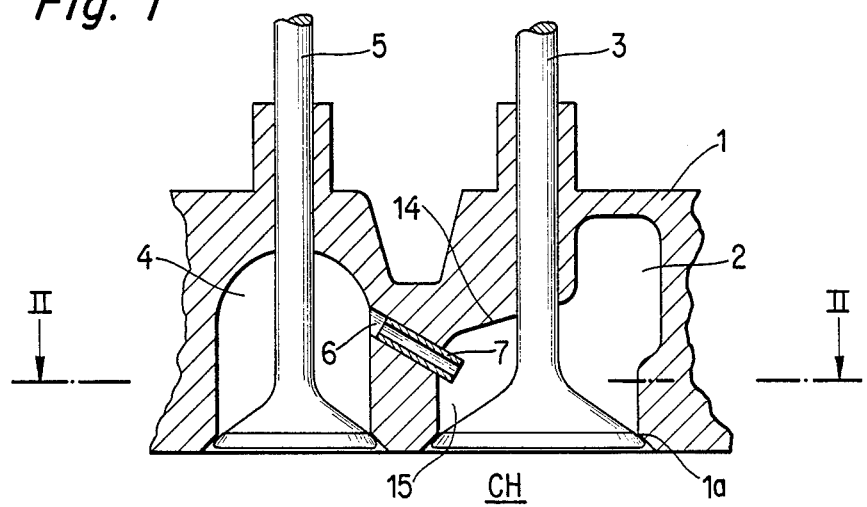
FIG. 1 is a fragmentary axial sectional view of the head of a cylinder which embodies the invention.

FIG. 1 shows the head 1 of a cylinder which forms part of an internal combustion engine, such as a diesel engine, and has two discrete passages 2 and 4. The passage 2 serves to admit atmospheric air into a combustion chamber CH which is adjacent the head and can be defined by the cylinder jointly with the associated piston or which is provided in the head of the piston, for example, in a manner as described and shown in commonly owned U.S. Pat. No. 4,593,660, granted June 10, 1986 for Ludwig and Günter Elsbett for "Piston drive for use in diesel engines or the like". The disclosure of this patent is incorporated herein by reference. The admission of air from the passage 2 into the chamber CH is controlled by a first valve 3 having a reciprocable shank or stem and a tappet 10 which normally seals the circular outlet of the passage; such outlet is defined by a circular seat 1a of the cylinder head 1. The flow of combustion products from the chamber CH into the passage 4 is controlled by a second valve 5 which is similar to and whose axis can be parallel with the axis of the valve 3.

The head 1 is further formed with a bore 6 which is inclined with reference to and is spaced apart from the axes of the valves 3 and 5 and defines a relatively short but straight path for the flow of a certain amount of hot combustion products from the passage 4 into the passage 2 in such a way that the flow of combustion products which issue from the bore 6 is substantially tangential to an imaginary circle 8 (indicated in FIG. 2 by a phantom line) whose center is located on the axis of the valve 3 and whose diameter equals or approximates 70 percent of the diameter of the tappet 10 and/or of the outlet portion of the passage 2 immediately adjacent the seat 1a of the cylinder head 1.

Figure 2:
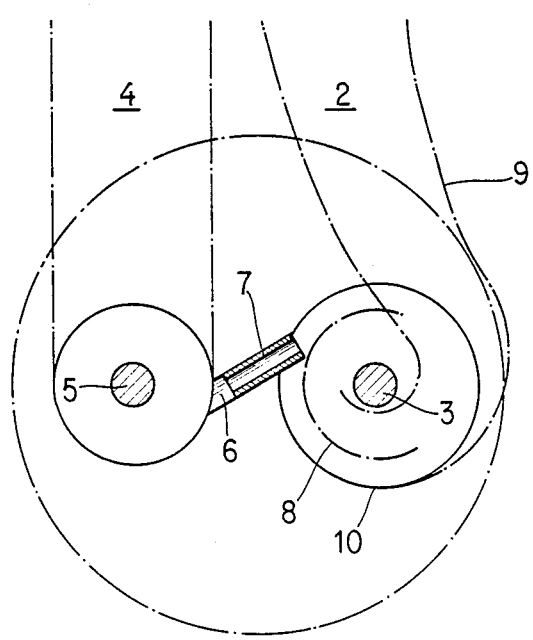
FIG. 2 is a sectional view as seen in the direction of arrows from the line II—II of FIG. 1.

The reference character 9 denotes in FIG. 2 the volute-shaped outline of the surface which bounds the passage 2 and causes the inflowing oxygen-containing air to form a vortex which is accelerated as a result of admission of hot combustion products via bore 6. This bore can be said to constitute a channel which connects the passages 2, 4 and which can have a diameter of 3–6 mm, preferably approximately 4 mm.

In order to allow for simple but efficient regulation of the direction of flow of combustion products from the passage 4 into the passage 2, i.e., to influence the vortex which is formed as a result of the flow of inflowing atmospheric air along the surface 9 of the head 1, the actual path for the flow of hot combustion products into the passage 2 can be defined by a tubular member or insert 7 which is installed in the bore 6 and defines a channel for hot combustion products. If the channel is defined by the tubular member 7, the diameter of the bore 6 can be enlarged so as to ensure that the channel which is defined by the member 7 will have a diameter of 3–6 mm, preferably about 4 mm.

Figure 3:
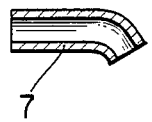
FIG. 3 is a sectional view of a first tubular member which can be used in the cylinder head to define the channel means between the two passages.

FIG. 3 shows that the inlet of the elongated path which is defined by the tubular member or insert 7 is inclined with reference to the outlet. This enables the assembler of the cylinder to ensure that the stream of hot combustion products issuing from the member 7 can be caused to flow in any of a number of different directions so as to exert a desired influence upon the mass of air which circulates in the passage 2.

Figure 4:
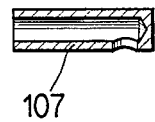
FIG. 4 is an axial sectional view of a modified tubular member.

FIG. 4 shows a modified tubular member or insert 107 which has an open first end for admission of combustion products and a closed second end. The outlet is adjacent the second end and serves to change the direction of flow of combustion products at an angle of 90 degrees.

Figure 5:
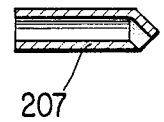
FIG. 5 is an axial sectional view of a third tubular member.

FIG. 5 shows a third tubular member or insert 207 which constitutes a slight modification of the tubular member 7 of FIG. 3 and has an outlet which causes an abrupt change in the direction of flow of combustion products leaving the member 207.

Many other types of tubular members can be used with equal or similar advantage. Such members can be installed in existing heads to select the direction of penetration of combustion products into the body of circulating air at the will of the operator. In addition, the cylinder head 1 can be formed with two or more channels for admission of discrete streams of hot combustion products from the passage 4 into selected portions of the passage 2 so as to even further enhance the circulation of air in the passage 2 prior to admission into the chamber CH.

The utilization of one or more bores 6 and/or tubular members (such as 7) which define a relatively narrow channel with a diameter not appreciably exceeding 4 mm is desirable and advantageous because this ensures that hot combustion products will penetrate into the mass of circulating air only when the pressure differential between the passages 2 and 4 is sufficiently pronounced. Such pronounced pressure differential will develop when the valve 3 opens in order to admit circulating air into the combustion chamber CH. At such time, the stream of hot combustion products flowing through the channel which is defined by the bore 6 or by the tubular member 7, 107 or 207 acts not unlike a jet which accelerates the column or mass of air at the seat 1a and sets the mass of air in rotary motion or further accelerates the rotating mass of air. Satisfactory results were obtained with the aforediscussed orientation of the channel, namely that the stream of hot combustion products which enters the passage 2 flows tangentially of the imaginary circle 8. As can be seen in FIG. 1, the outlet of the tubular member 7 can be placed into close or immediate proximity of the tappet 10 and seat 1a.

In accordance with a presently preferred emodiment, the bore or channel is so very closely adjacent the valve tappets that it serves to generate and/or promote the formation of a vortex or an analogous form of turbulence in the passage 2. The tubular member 7, 107 or 207 determines the direction of flow of combustion products from the passage 4 into the passage 2.

The surface 9 which is shown in FIG. 1 bounds the passage 2 and is analogous to the surface bounding the passage shown in FIG. 2 of the aforementioned U.S. Pat. No. 3,945,363 to Elsbett et al. The disclosure of this patent is incorporated herein by reference. A comparison of FIG. 1 of the present application with FIG. 1 of the patent to Elsbett et al. will show that the outline of the surface bounding the passage 2 is very similar to that of the surface bounding the air admitting channel in the cylinder of Elsbett et al. The channel 6 is provided in the region of the lower end (substantially at 14) of the helical portion of the passage 2, namely in the region of the topmost or upper region of the non-helical portion 15 of the passage 2 adjacent the valve seat 1a. The channel 6 or the tubular member 7, 107 or 207 therein directs the stream of combustion products toward the seat 1a and substantially tangentially of the imaginary circle 8 shown in FIG. 2. Thus, when the valve 3 is open, the spiral flow of air can enter the combustion chamber CH practically without any obstruction. The inclination of the channel 6 with reference to the undersurface or underside of the cylinder head 1 is the same as or close to the slope of the helix which is defined by the surface 9 so that the helix which is formed by the surface 9 is not altered but is merely accelerated or rendered more pronounced by the stream of combustion products entering the portion 15 of the passage by way of the channel 6.

Figure 6:
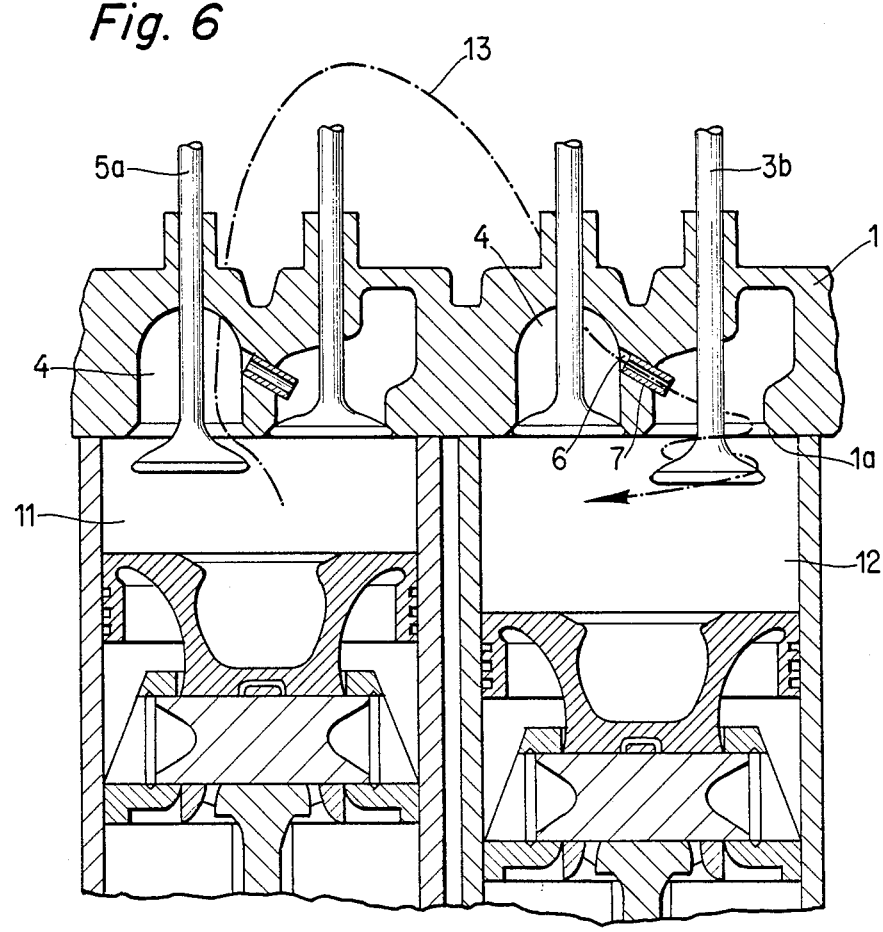
FIG. 6 is a fragmentary axial sectional view of two adjoining cylinders with a common cylinder head.

FIG. 6 shows a portion of an engine with several cylinders having a common head 1 and discrete cylinder chambers 11, 12. As a rule, an engine embodying several cylinders is formed with a common channel for evacuation of combustion products from all cylinder chambers (such common channel is not specifically shown in FIG. 6), i.e., from all passages 4. The pressure wave 13 (indicated in FIG. 6 by a phantom line) which is generated by the cylinder from which the combustion products are being evacuated propagates itself through the open valve 5, through the aforementioned common channel for evacuation of combustion products and through the channel 6 or through the tubular member 7, 107 or 207 in the channel 6.

Another important advantage of the improved cylinder head is that the admission of a certain percentage of combustion products into the mass of air in the passage immediately above the respective tappet reduces the quantity of emitted noxious fumes, particularly nitrogen oxide but also uncombusted hydrocarbons and carbon monoxide.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A cylinder for use in internal combustion engines, particularly in diesel engines, comprising a head having an air-admitting first passage and a second passage for evacuation of combustion products, and channel means connecting said passages so as to admit combustion products into said first passage; tubular means installed in said channel means to determine the direction of flow of combustion products from said second passage into said first passage; and valve means installed in said head to control the outflow of air from said first passage and the inflow of combustion products into said second passage, said channel means being closely or immediately adjacent said valve means and being arranged to effect the formation of a vortex of air in said first passage.

2. A cylinder for use in internal combustion engines, particularly in diesel engines, comprising a head having an air-admitting first passage and a second passage for evacuation of combustion products, a bore connecting said passages so as to admit combustion products into said first passage, and a tubular member installed in said bore.

3. The cylinder of claim 2, wherein said bore has an inlet which communicates with said second passage and an outlet which communicates with said first passage and is inclined with reference to said inlet.

4. A cylinder for use in internal combustion engines, particularly in diesel engines, comprising a head having an air-admitting first passage and a second passage for evacuation of combustion products, and a bore connecting said passages so as to admit combustion products into said first passage, said bore having an effective diameter of 3–6 mm.

5. The cylinder of claim 4, wherein said diameter is approximately 4 mm.

6. A method of forming a head for the cylinder of an internal combustion engine, particularly a diesel engine, comprising the steps of forming the head with an air-admitting first passage and a second passage for evacuation of combustion products; and drilling into the head a bore which connects the first and second passages so as to admit combustion products into the first passage.

7. A cylinder for use in internal combustion engines, particularly in diesel engines, comprising a head having an air-admitting first passage and a second passage for evacuation of combustion products, and a bore drilled into said head and connecting said passages so as to admit combustion products into said first passage.

8. The cylinder of claim 7, wherein said head has a substantially volute-shaped surface bounding said first passage.

9. The cylinder of claim 7, further comprising first and second valves installed in said head and having reciprocable tappets for respectively controlling the outflow of air from said first passage and the inflow of combustion products into said second passage, said tappets having parallel axes and said bore being inclined with reference to and being spaced apart from said axes.

10. The cylinder of claim 7, further comprising valve means installed in said head to control the outflow of air from said first passage and the inflow of combustion products into said second passage, said bore being closely or immediately adjacent said valve means and being arranged to effect the formation of a vortex of air in said first passage.

11. The cylinder of claim 7, further comprising valve means for the outflow of air from said first passage, said head having a substantially circular seat for said valve means and said bore being oriented to direct a stream of combustion products into said first passage substantially tangentially of said seat.

12. The cylinder of claim 7, wherein said bore establishes a permanent path for the flow of combustion products between said passages.

13. The cylinder of claim 7, further having a combustion chamber and valve means for controlling the admission of air from said first passage into said chamber, said valve means having an axis and said bore being arranged to admit combustion products into said first passage substantially tangentially of a circle having its center on said axis.

14. The cylinder of claim 13, wherein said head has a substantially circular seat defining an outlet of said first passage and the diameter of said circle approximates or equals 70 percent of the diameter of said first passage in the region of said outlet.

* * * * *